(12) United States Patent
Vinogradov et al.

(10) Patent No.: US 11,334,964 B2
(45) Date of Patent: May 17, 2022

(54) COLOR IMAGE PROCESSING ON THE FLY FOR BAR CODE READERS

(71) Applicant: ZEBRA TECHNOLOGIES CORPORATION, Lincolnshire, IL (US)

(72) Inventors: Igor Vinogradov, Oakdale, NY (US); Mark Drzymala, Saint James, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 50 days.

(21) Appl. No.: 16/694,297

(22) Filed: Nov. 25, 2019

(65) Prior Publication Data

US 2021/0158479 A1    May 27, 2021

(51) Int. Cl.
*G06T 3/40* (2006.01)
*G06T 7/90* (2017.01)
*G06K 7/12* (2006.01)
*G06K 7/14* (2006.01)

(52) U.S. Cl.
CPC .............. *G06T 3/4015* (2013.01); *G06K 7/12* (2013.01); *G06K 7/1413* (2013.01); *G06T 7/90* (2017.01); *G06T 2207/10024* (2013.01)

(58) Field of Classification Search
CPC .............. G06T 3/4015; G06T 7/90; G06T 7/12; G06T 7/1413; G06T 2207/10024

USPC .......... 235/462.04, 462.09, 462.11
See application file for complete search history.

(56) References Cited

U.S. PATENT DOCUMENTS

| | | | |
|---|---|---|---|
| 10,747,977 B2* | 8/2020 | Schneider | H04N 1/6077 |
| 2012/0000983 A1* | 1/2012 | Bhagwan | G06K 7/146 235/462.04 |
| 2012/0121177 A1* | 5/2012 | Li | H04N 1/40012 382/167 |
| 2012/0211555 A1* | 8/2012 | Rowe | G06K 7/1404 235/375 |
| 2014/0354826 A1* | 12/2014 | Kolarov | G06K 9/00718 348/175 |
| 2017/0351893 A1* | 12/2017 | Schneider | G06K 7/10722 |

* cited by examiner

*Primary Examiner* — Christle I Marshall
(74) *Attorney, Agent, or Firm* — Yuri Astvatsaturov

(57) ABSTRACT

Methods and devices for performing color imaging processing on the fly for barcode readers are disclosed herein. An example method includes color image processing in a barcode reader to identify one of raw image data or processed image data and further decoding indicia in the identified raw or processed image data. The method includes receiving a raw image data of an image of an object, performing image processing on the raw image data, analyzing the raw image data and the processed image data, and identifying which of the raw image data or processed image data to communicate to a decoder for further decoding. The decoder then identifies, in the identified raw image data or processed image data, indicia corresponding to an object, and decodes the identified indicia.

21 Claims, 12 Drawing Sheets

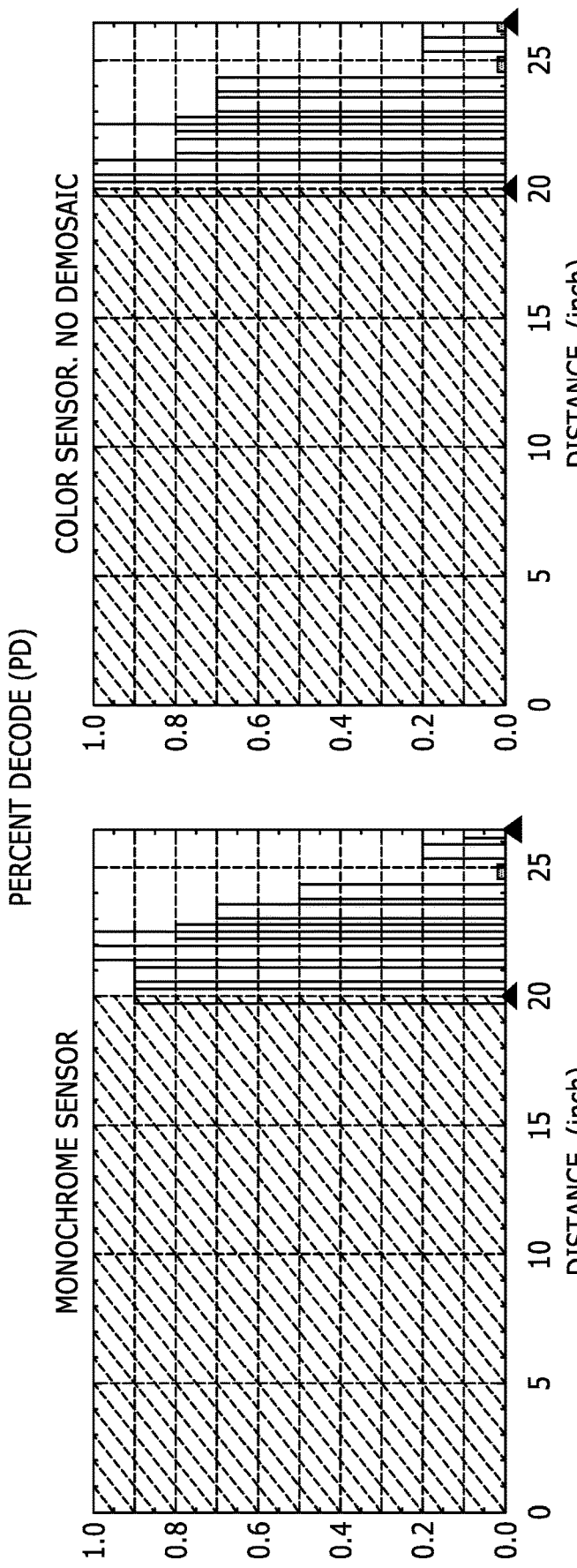
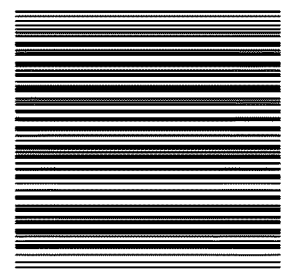
FIG. 8A
FIG. 8B
FIG. 8C

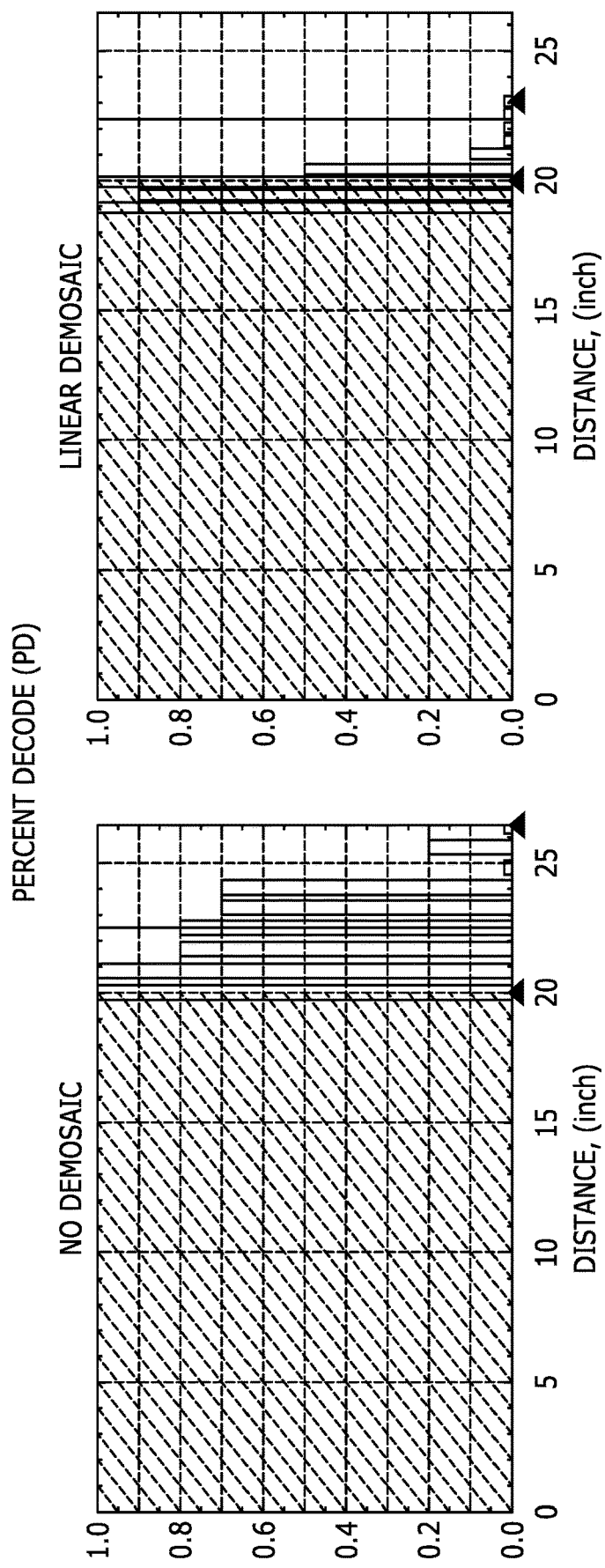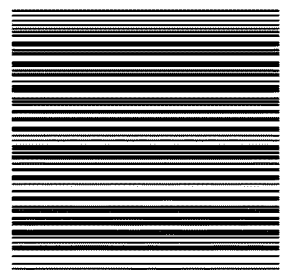
FIG. 9B
FIG. 9C
FIG. 9A

COLOR IMAGE PROCESSING ON THE FLY FOR BAR CODE READERS

BACKGROUND

Color imagers in bar code readers are becoming more pervasive due to lower costs and the desire for color images in the bar code scanning industry. Due to a relative loss of information when going from monochrome to color imaging technology using traditional processing methods, the contrast of color image sensing suffers compared to black and white image sensing when reading bar codes with a color imaging sensor under white illumination. Additionally, using color sensors to read color barcodes may result in lower contrast, or resolution, since the number of color pixels in color sensors are typically fewer compared to the monochrome pixels in comparable monochrome sensors.

Demosaicing is a common practice performed in color image processing that "fills in" the gaps of image data that are due to the lower number of pixels in color imagers. While demosaicing reduces image contrast and modulation, it also approximates missing color pixels and recombines the approximations into a single color image. However, it is typically easier for a decoder to recode black and white bar codes from raw image data because demosaicing a black and white image typically results in a loss of information.

SUMMARY

In an embodiment, the present invention is a method for color image processing in a barcode reader. The method comprises receiving, by a color imager in the barcode reader, a raw image data of an image of an object; analyzing, at an imaging circuit of the color imager configured to output the raw image data and/or to output processed image data generated from the raw image data, the raw image data and/or the processed image data to identify one of the raw image data and the processed image data for decoding; communicating an identified one of the raw image data and the processed image data to an indicia decoder; and analyzing, in the indicia decoder, the identified one of the raw image data and the processed image data to identify an indicia corresponding to the object, and decoding an identified indicia.

In a variation of this embodiment, analyzing the raw image data and/or the processed image data comprises: performing, in the imaging circuit, a statistical analysis on the raw image data and, in response, identifying one of the raw image data and the processed image data for decoding. In this variation of this embodiment, performing the statistical analysis comprises at least one of performing a spatial frequency content analysis, chromatic content analysis, spatial resolution analysis, image size analysis, sharpness analysis, or image contrast analysis.

In a variation of this embodiment, analyzing the raw image data and/or the processed image data comprises: in the imaging circuit, analyzing the raw image data; generating the processed image data from the raw image data; analyzing the processed image data; and comparing the analysis of the raw image data to the analysis of the processed image data to identify one of the raw image data and the processed image data for decoding.

In a variation of the current embodiment, analyzing the raw image data and/or the processed image data comprises: demosaicing, in the imaging circuit, color image data contained in the raw image data; reconstructing, in the imaging circuit, the color image data, a reconstructed color image data being the processed image data; and performing, in the imaging circuit, a statistical analysis on the reconstructed color image data and, in response, identifying the one of the raw image data and the reconstructed color image data for decoding.

In another variation of the current embodiment, the imaging circuit of the color imager configured to output the processed image data is further configured to generate the processed image data by applying, to the raw image data, at least one of an identity mask, a spatial lowpass filter, a spatial highpass filter, a Fourier transform, a Fourier lowpass filter, a Fourier highpass filter, an edge detection, a rotation, a scale, a shear, mosaicing, demosaicing, patch extracting, and patching.

In another embodiment, the present invention is a barcode reader that comprises: a color imager configured to receive raw image data of an image of an object; a non-transitory memory configured to store the image data and computer readable instructions; an imaging circuit configured to output the raw image data and/or to output processed image data generated from the raw image data; an indicia decoder; and one or more processors configured to execute the computer readable instructions causing the color image scanning system to: receive, by the color imager, raw image data indicative of an image of an object; analyze, at the imaging circuit, the raw image data and/or the processed image data to identify one of the raw image data and the processed image data for decoding; communicate an identified one of the raw image data and the processed image data to an indicia decoder; analyze, in the indicia decoder, the identified one of the raw image data and the processed image data to identify an indicia corresponding to the object; and decode an identified indicia.

In yet another embodiment, the present invention is a method for color image processing that comprises receiving, by a color imager, raw image data of an image of an object; processing, at an imaging circuit, the raw image data to generate processed image data; analyzing, at a processor, at least one of the raw image data and the processed image data by performing a statistical analysis on at least one of the raw image data and the processed image data; and identifying, at the processor, one of the raw image data or processed image data for detection of an indicia and decoding of the indicia.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 8A is a percent decode verse barcode scanning distance plot for scanning a black and white Universal Product Code (UPC) barcode by a monochromatic barcode reader.

FIG. 8B is a percent decode verse barcode scanning distance plot for scanning a black and white UPC barcode by a color barcode reader.

FIG. 8C is the black and white UPC barcode used to generate the plots of FIGS. 8A and 8B.

FIG. 9A is a percent decode verse scanning distance plot for a color image barcode reader scanning a black and white UPC barcode, without performing image demosaicing on the raw image data.

FIG. 9B is a percent decode verse scanning distance plot for a color image barcode reader scanning a black and white UPC barcode, with performing a linear image demosaicing on the raw image data.

FIG. 9C is the black and white UPC barcode used to generate the results of FIGS. 9A and 9B.

Figure 1:
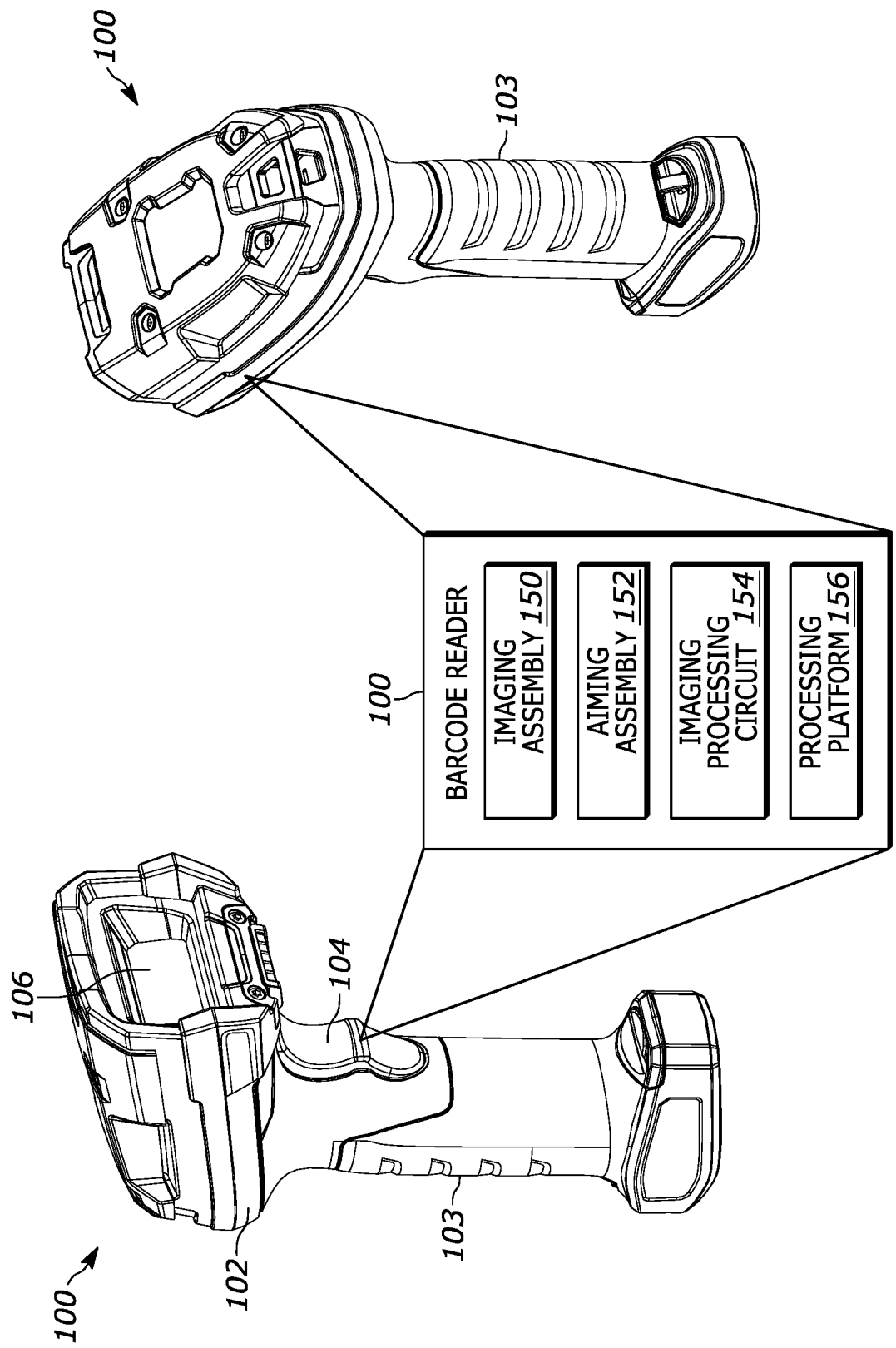
FIG. 1 illustrates a barcode reader for implementing example methods and/or operations described herein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

In various embodiments of the present disclosure, a method, and related systems and devices, are described for color image processing in a barcode reader. In various embodiments, a method includes receiving raw image data at a color imager in a barcode reader and analyzing the raw image data in an imaging circuit. The method further includes processing the raw image data to generate processed image data and analyzing the raw image data and processed image data to determine which of the raw or processed image data to further analyze and decode indicia from. In some embodiments, the method further includes performing statistical analysis on the raw image data and the processed image data and identifying either the raw image data or processed image data for further analysis and decoding. In embodiments described herein, the imaging circuit may process the image data using multiple image processing methods to output multiple sets of processed image data. The processor may then analyze the raw data and the multiple sets of processed image data to determine an image data set to further analyze and decode a barcode from. The various embodiments described herein may be performed in series or parallel in a barcode scanner and may prevent the need for demosaicing color images. In this way, in various embodiments, the method can determine a preferred image data set for decoding a barcode which may increase barcode decode rate, accuracy, and read distance.

In various embodiments, barcode readers configured to perform such methods are provided as well.

FIG. 1 is an illustration of an example barcode reader 100 capable of implementing operations of the example methods described herein, as may be represented by the flowcharts of the drawings that accompany this description. In the illustrated example, the barcode reader 100 includes a housing 102 with a handle 103 having a trigger 104 on an interior side of the handle. In the illustrated example, the barcode reader 100, enters into a read operation state, by an operator pulling the trigger 104 to scan barcodes. In some examples, the barcode reader 100 is maintained in the read operation state as long as the trigger 104 is depressed, while in other examples the read operation state is entered with a first trigger pull and exited with a subsequent trigger pull.

The housing 102 further includes a scanning window 106 through which the barcode reader 100 illuminates a target such as a packaging, surface, or a pick list for decoding a barcode on the target. As used herein, reference to a barcode includes any indicia that contains decodable information and that may be presented on or within a target, including by not limited to, a one dimension barcode, a two dimension barcode, a three dimension barcode, a four dimension barcode, a QR code, a direct part marking (DPM), a color barcode, a barcode embedded on a color background, another color image with indicia, etc.

In the illustrated example, the barcode reader 100 includes an imaging assembly 150 configured to capture an image of a target within a predetermined field of view, and in particular, to capture an image that includes a barcode on the target. The barcode reader 100 further includes an aiming assembly 152 configured to generate an aiming pattern, e.g., dot, crosshairs, line, rectangle, circle, etc., that is projected onto the target. The barcode reader 100 further includes image processing circuitry 154 configured to process raw image data provided by the imaging assembly 150 to the image processing circuitry 154. The image processing circuitry 154 may be configured to perform any number of transforms, masks, or other image processing techniques and methods on the raw image data to generate processed image data. Additionally, the image processing circuit 154 may determine not to perform image processing on the raw image data. The barcode reader 100 may further include a processing platform 156 configured to interface with the imaging assembly 150, the aiming assembly 152, the image processing circuitry 154, and other components of the barcode reader 100 to implement operations of the example methods described herein, including those as may be represented by the flowcharts of the drawings such as FIGS. 6A and 7. In some embodiments, barcode readers described herein may include other elements or systems, such as an illumination assembly for providing monochromatic, white, ultraviolet, or another type of illumination to a target, as described further in reference to FIG. 3.

Figure 2:
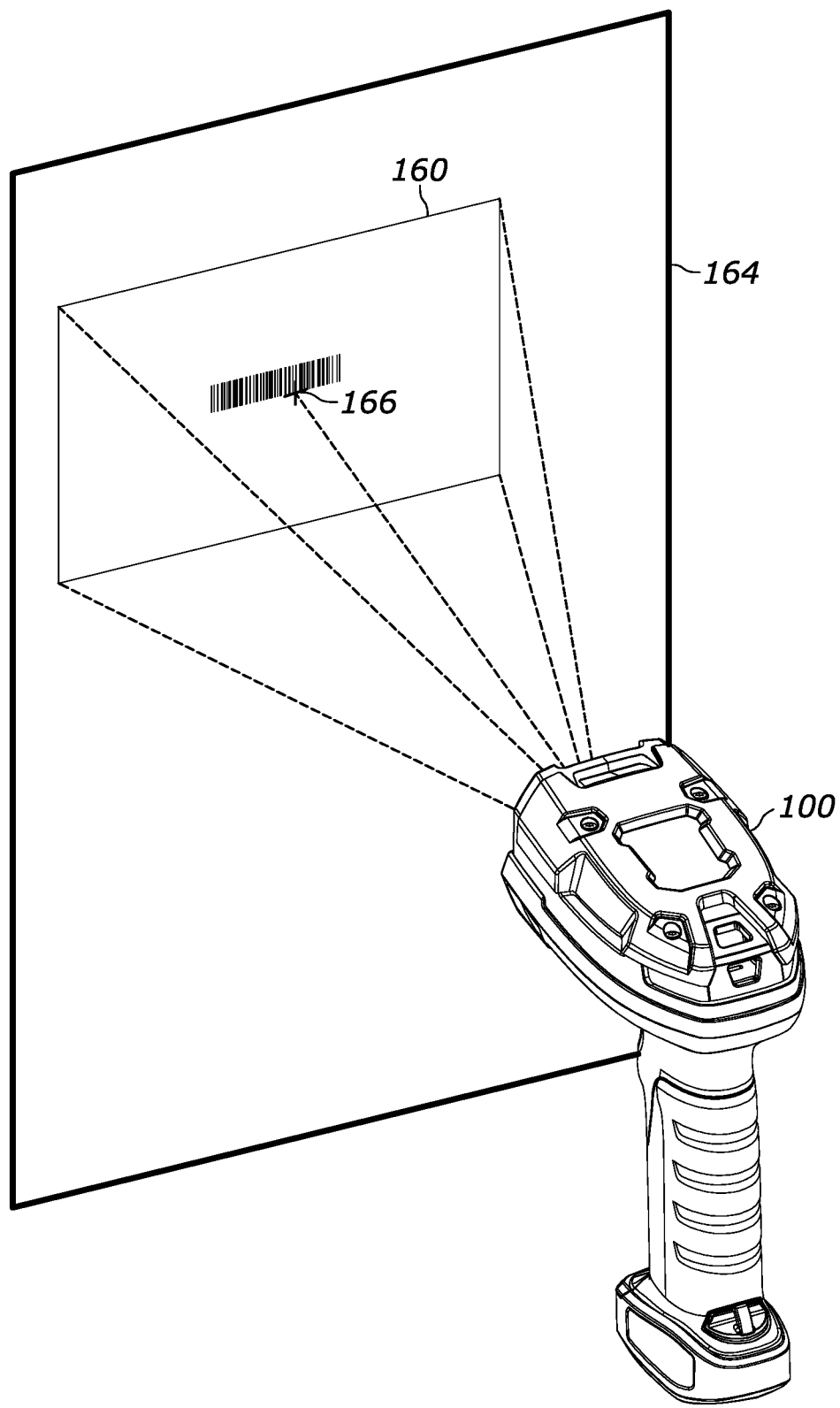
FIG. 2 illustrates operation of the barcode reader of FIG. 1 scanning a barcode, in accordance with implementations of the techniques described herein.

FIG. 2 illustrate operation of the barcode reader 100, in accordance with implementations of the techniques herein. In FIG. 2, the barcode reader 100 is shown in an operational mode having a FOV 160 that sets the bounds for an image environment that may be captured by the imaging apparatus 150. In embodiments, the FOV 160 may be determined by the distance of the barcode reader from a target 164. In the illustrated example, the aiming assembly 152 has generated an aiming pattern 162, which may be a crosshair as shown in FIG. 2. In various embodiments, the aiming pattern 162, may be a dot, multiple dots, multiple crosshairs, or another aiming pattern. In embodiments, the aiming pattern 162, is centered within the FOV 160 and is incident on the target 164 in the center an environment captured as an image by the barcode reader 100.

In operation, the barcode reader 100 is positioned such that the aiming pattern 162 is incident on a barcode 166, thereby indicating that the barcode 166 is to be decoded, and a decode signal including decoded barcode data, is sent to a remote system. The remote management system may be an inventory management system, payment processing system, theft prevention system, or other network-accessed system or network accessible server.

Figure 3:
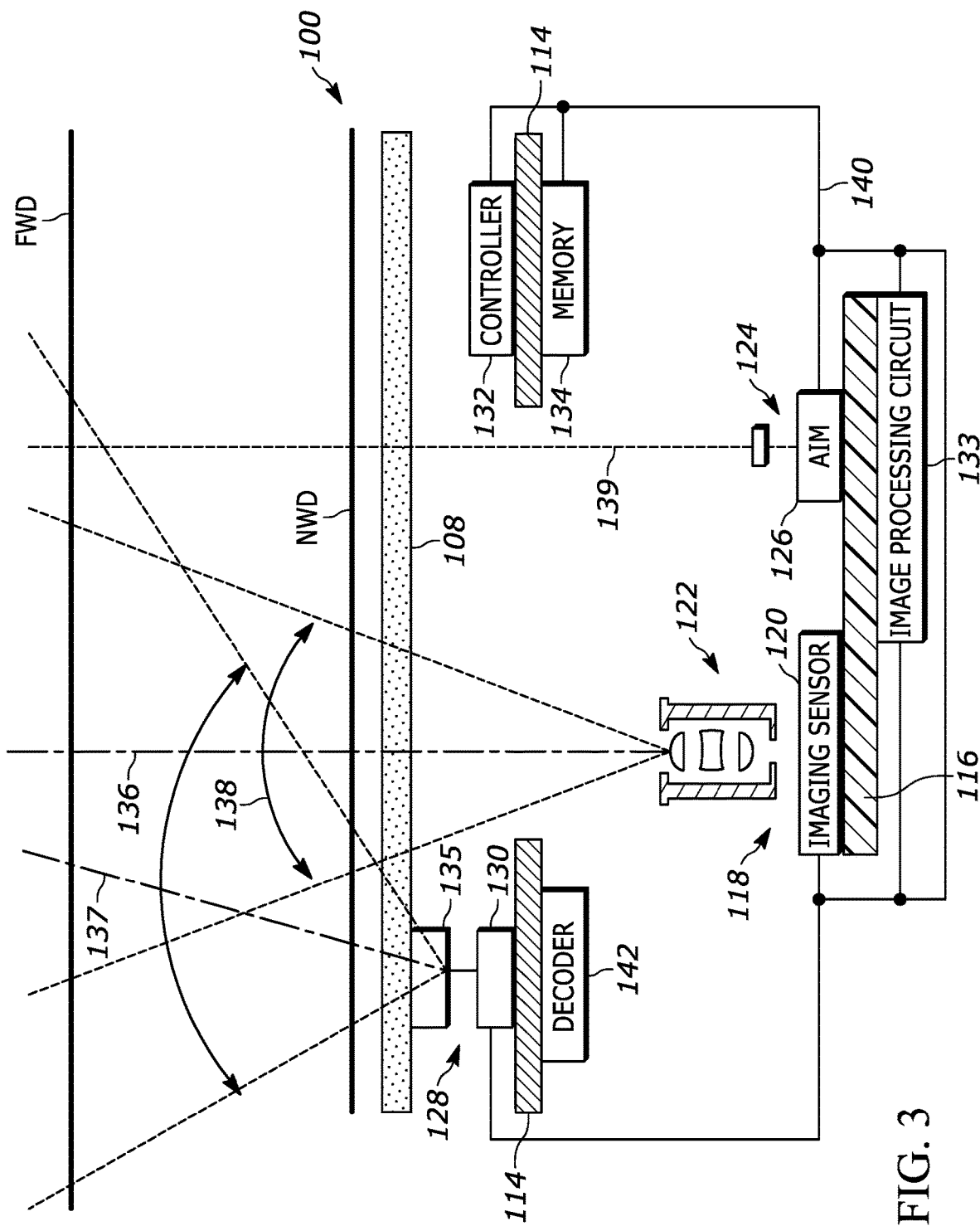
FIG. 3 illustrates a block schematic diagram of a portion of the barcode reader of FIG. 1 in accordance with some embodiments described.

FIG. 3 illustrates a block schematic diagram of a portion of the barcode reader 100 in accordance with some embodiments. It should be understood that FIG. 3 is not drawn to scale. The barcode reader 100 in FIG. 3 includes: (1) a first circuit board 114; (2) a second circuit board 116; (3) an imaging assembly 118 that includes an imaging sensor 120, and an imaging lens assembly 122; (4) an aiming assembly 124 that includes an aiming light source 126; (5) an illumination assembly 128 that includes an illumination light source 130; (6) a controller 132; (7) an image processing circuit 133; and (8) a memory 134.

The imaging sensor 120 may be either CCD or CMOS imaging sensors that generally include multiple photosensitive pixel elements aligned in a one-dimensional array for linear sensors, or a two-dimensional array for two-dimensional sensors. The imaging sensor 120 is operative to detect light captured by the imaging assembly 118 along an optical path or central field of view (FOV) axis 136 through a window 108. Generally, the image sensor 120 and imaging lens assembly 122 pair is configured to operate together for capturing light scattered, reflected, or emitted from a barcode as pixel data over a one-dimensional or two-dimensional FOV 138 that extends between a near working distance (NWD) and a far working distance (FWD). NWD and FWD denote the distances between which the imaging assembly 118 is designed to read barcodes. In some embodiments, the NDW is between approximately 0 and approximately 2 centimeters from the window 108 and the FWD is between approximately 25 and approximately 150 inches from the window 108.

The imaging sensor 120 is operated by the controller 132, which may be a microprocessor, FPGA, or other processor, that is communicatively connected thereto. Additionally, the controller 132 is communicatively connected to the aiming light source 126, illumination light source 130, image processing circuit 133, and memory 134. Although the link between these components is illustrated as a single communication bus 140, this is merely illustrative, and any communication link between any of the devices may either be dedicated or may include more than the two selected devices. Additionally, placement of components on either side of any of the circuit boards is similarly exemplary. In operation, the memory 134 can be accessible by the controller 126 for storing and retrieving data. In some embodiments, the first circuit board 114 also includes a decoder 142 for decoding one or more barcodes that are captured by the imaging sensor 120. The decoder 142 may be implemented within the controller 132 or as a separate module 142.

The image processing circuit 133, which may be a microprocessor, FPGA, dedicated image processing unit (IPU), or image signal processor (ISP), may be in communication with the controller 132, and memory 134 for communicating data between the image processing circuit 133 and the controller 132 and/or memory 134. The image processing circuit 133 may be in communication with the imaging sensor 120 such that the imaging sensor 120 may send captured, raw image data to the image processing circuit 133. The image processing circuit 133 may then perform image analysis of the raw image data, and/or perform image processing techniques on the raw image data to generate processed image data. In embodiments, the image processing circuit 133 may output a single set of image data or multiple sets of image data and provide the set or sets of image data to the memory 134 and/or controller 132. The image processing circuit 133 may also provide a set or sets of image data to the decoder 142 for decoding of indicia that may be contained in the image data. In embodiments, the image processing circuit 133 may also determine what type of image data to output. The image processing circuit 133 may make the determination to output raw image data, processed image data, multiple sets of processed image data, or the raw image data and a set or sets of processed image data to the controller 132, memory 134, and/or decoder 142.

In an operation example, the imaging sensor 120 may detect light captured by the imaging assembly 118 in accordance with exposure parameters. The exposure parameters may be based on at least one of ambient illumination level, a distance of an object being captured by the imaging sensor 120, a color of an object being captured by the imaging sensor 120, and a color of a barcode on an object being captured by the imaging sensor 120 wherein the barcode is to be decoded by the decoder 142. Further, the exposure parameters may be a focus of the imaging assembly 118, a white balance correction of the imaging sensor 120, and a level of illumination provided by the illumination light source 130. The exposure parameters may be determined from an auto-exposure region wherein the auto-exposure region is less than one percent of the size of the field of view 138 or less than five percent the size of the field of view 138. The exposure parameters may be stored at the memory 134.

An image captured by the imaging sensor may comprise image property data including a brightness of the image and a contrast of the image. Image property data may be natively output by the imaging sensor 120, or may be determined at the decoder 142, the controller 132, or the image processing circuit 133. In embodiments, the imaging sensor 120 provides the image processing circuit 133 with raw image data, and the image processing circuit 133 performs analysis on the raw image data to determine image property data. The determined image property data may include image contrast data, image spatial frequency content, image chromatic content data, spatial resolution data, image size data, image sharpness data, image brightness data, among other types of image property data. In embodiments, the imaging sensor 120 may have built in circuits and features to determine image property data and to output the image property data to the image processing circuit 133, the controller, 132, and/or the memory 134.

As indicated above, the illumination light source 130 is communicatively connected to the controller 132, and is activated by the controller 132 in response to a user actuating the trigger 110 in a handheld mode of operation. In a hands free mode of operation, the controller 132 may continuously activate the illumination light source 130. The illumination light source 130 is operative to emit light through the window 108 along an optical path or central illumination axis 137 through the window 108. In an embodiment, the illumination light source 130 is vertically offset from the imaging sensor 120. In another embodiment, in order to avoid directing an intense amount of light at the middle of a barcode and over-saturating the barcode image, the barcode reader has two illumination light sources, each horizontally offset to either side of the imaging sensor 120. In embodiments, the illumination light source 130 may be configured to provide monochromatic light, white, light, ultraviolet light, or light with a band of frequencies or colors for illuminating a target.

As indicated above, the aiming light source 126 is communicatively connected to the controller 132. The aiming light source 126 and aiming assembly 124 are operative to emit light in the form of an aiming pattern through the window 108 along the aiming path or central aiming axis 139, the aiming pattern is defined by the central aiming axis 139. A user of the scanner 100 may use the aiming pattern as a guide bring a barcode into the FOV 138 such that the barcode is captured. In a hands free mode, the controller 132 may cease activation of the aiming light source 126 immediately subsequent to the capture of an image at the imaging sensor 120. In a handheld mode, the controller may cease activation of the aiming light source 126 in response to activating the trigger 110 such that the aiming pattern does not interfere with image capture. As shown in FIG. 3, the aiming assembly 124 is offset from the imaging assembly 118 resulting in an off-axis configuration of the central aiming axis 139 and the FOV 138 including the central FOV axis 136.

In the embodiment illustrated in FIG. 3, the illumination light source 130 is provided on the first circuit board 114, whereas the imaging sensor 120 is provided on the second circuit board 116. However, in some embodiments, the illumination light source 130 and the imaging sensor 120 are provided on the same circuit board. The optical element 135 may be any optical element that redirects light emitted by the illumination light source 130, and, more particularly, redirects the central illumination axis 137 of the illumination light source 130 with little to no magnification of the light. In some embodiments, the optical element 135 is a prism, such as a deflecting prism, though the optical element 135 may also be a mirror, a series of mirrors, optical waveguide(s), etc. Where the optical element 135 is an optical waveguide, it will be understood that an optical waveguide restricts the spatial range in which the light can propagate using a region having an increased refractive index as compared to the surrounding medium. Examples of suitable optical waveguides include, but are not limited to, single mode optical fiber, channel waveguides, planar waveguides, and strip waveguides. Preferably, the optical element does not magnify, or only minimally magnifies, the illumination light from the illumination light source 130 in order to avoid specular reflections off the barcode. In an embodiment, the optical element 135 provides an optical magnification of less than 1.5×, where the magnification of the optical element 135 is measured as: $M=f/(f-d_o)$, where f is the focal length of the optical element 135, and $d_o$ is the distance between the optical element 135 and the illumination light source 130.

The optical element 135 is preferably made of a low dispersion material having an Abbe number of at least 40, so as to maintain the wavelength of the light emitted by the illumination light source 130 (e.g., 620-660 nanometers). The Abbe number is a measure of the material's wavelength dispersion (with high values indicating low dispersion). Examples of low dispersion materials include, but are not limited to, poly(methyl methacrylate) (PMMA), crown material (e.g., crown glass, crown plastic), cyclo olefin polymer, acrylic, and polycarbonate).

In an embodiment, the optical element 135 is adhered, or otherwise affixed, to the window 108. In a different embodiment, the window 108 may be molded such that the optical element 135 is integral with the window 108. In yet another embodiment in which the barcode reader 100 has two illumination sources, an optical element 135 may be provided for each illumination light source. In a different embodiment in which the barcode reader 100 has two illumination light sources, the optical elements 135 may be integral with one another, such as a single prism extending in width to each of the illumination light sources.

Figure 4:
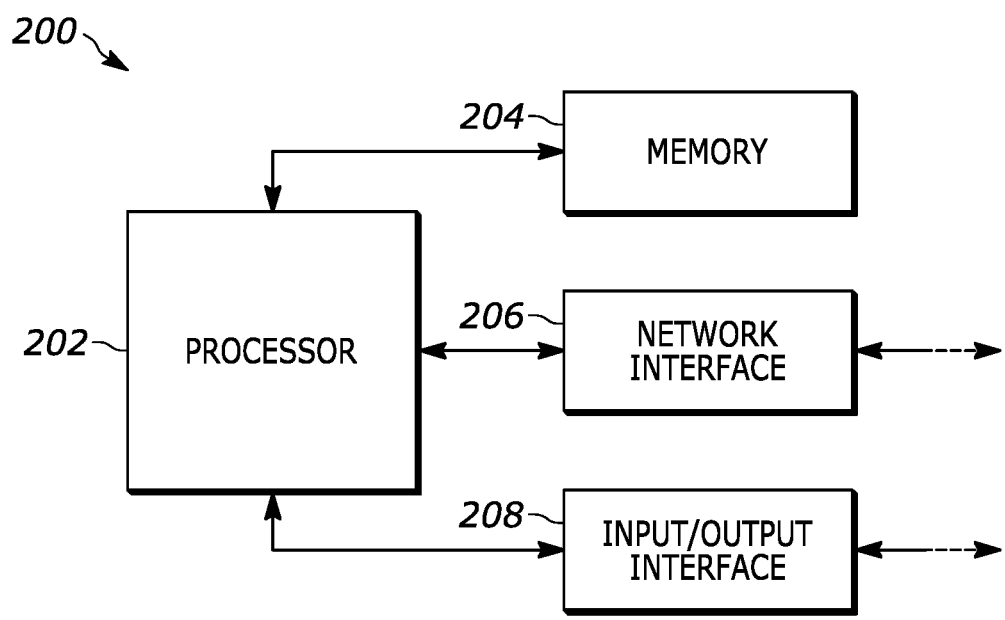
FIG. 4 is a block diagram of an example logic circuit for implementing example methods and/or operations described herein.

FIG. 4 is a block diagram representative of an example logic circuit capable of implementing, for example, one or more components of the example barcode reader 100 for performing color image processing of FIG. 1. The example logic circuit of FIG. 4 is a processing platform 200 capable of executing instructions to, for example, implement operations of the example methods described herein, as may be represented by the flowcharts of the drawings that accompany this description. Other example logic circuits capable of, for example, implementing operations of the example methods described herein include field programmable gate arrays (FPGAs) and application specific integrated circuits (ASICs).

The example processing platform 200 of FIG. 4 includes a processor 202 such as, for example, one or more microprocessors, controllers, and/or any suitable type of processor. The example processing platform 200 of FIG. 4 includes memory (e.g., volatile memory, non-volatile memory) 204 accessible by the processor 202 (e.g., via a memory controller). The example processor 202 interacts with the memory 204 to obtain, for example, machine-readable instructions stored in the memory 204 corresponding to, for example, the operations represented by the flowcharts of this disclosure. Additionally or alternatively, machine-readable instructions corresponding to the example operations described herein may be stored on one or more removable media (e.g., a compact disc, a digital versatile disc, removable flash memory, etc.) that may be coupled to the processing platform 200 to provide access to the machine-readable instructions stored thereon.

The example processing platform 200 of FIG. 4 also includes a network interface 206 to enable communication with other machines via, for example, one or more networks. The example network interface 206 includes any suitable type of communication interface(s) (e.g., wired and/or wireless interfaces) configured to operate in accordance with any suitable protocol(s).

The example, processing platform 200 of FIG. 4 also includes input/output (I/O) interfaces 208 to enable receipt of user input and communication of output data to the user.

The processor 202 may be configured to perform functions performed by elements described in reference to FIG. 3, and more specifically the processor 202 may execute machine readable instructions to perform functions of the image processing circuit 313, the controller 132, and the decoder 14

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

Figures 5A, 5B:
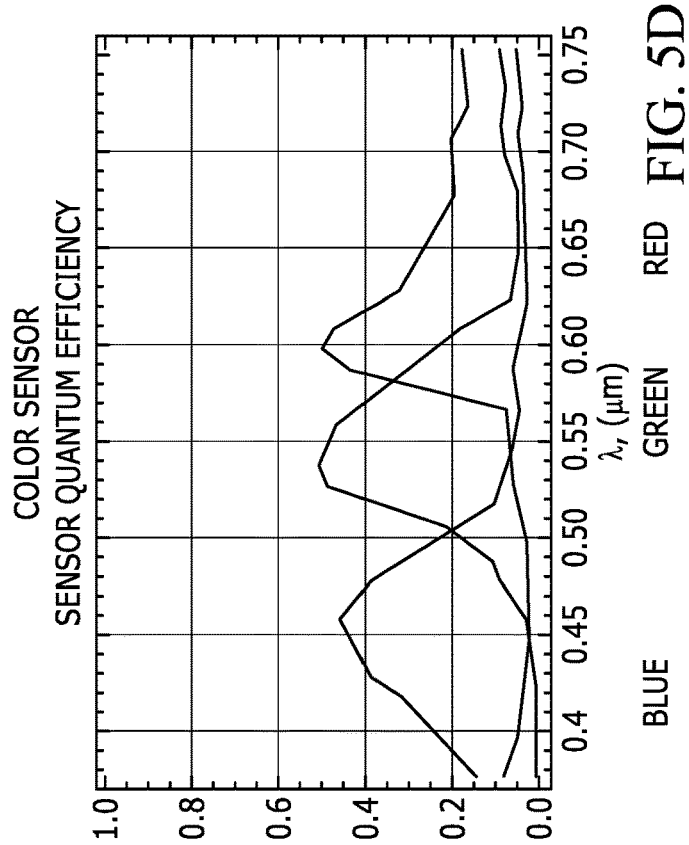
FIG. 5A is a monochromatic sensor array for capturing monochromatic images.
FIG. 5B is a Bayer filter color sensor array for capturing color images.
Figures 5C, 5D:
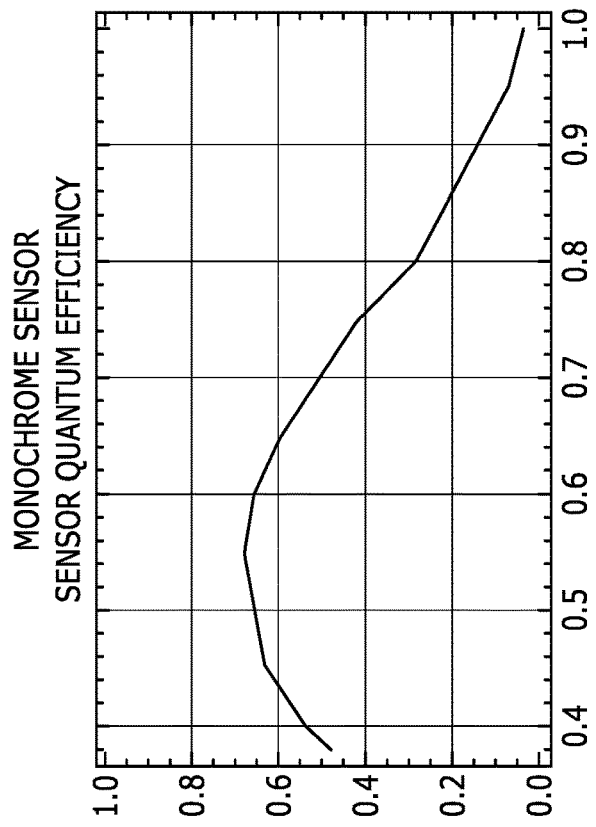
FIG. 5C is a plot of sensor quantum efficiency for a typical monochromatic sensor.
FIG. 5D is a plot of sensor quantum efficiency for a typical color sensor.

FIG. 5A is a monochromatic sensor array 500 for capturing monochromatic images, and FIG. 5B is a is a Bayer filter color sensor array 520 for capturing color images. The monochromatic array 500 illustrated in FIG. 5A includes a six-by-six grid of monochromatic sensors 1, while the Bayer color sensor array 520 has three different color sensors, red sensors denoted by the letter "R", green sensors denoted by the letter "G", and blue sensor denoted by the letter "B", configured in a six-by-six spatial pattern. FIGS. 5C and 5D are plots of sensor quantum efficiency for a typical monochromatic sensor and typical color sensors respectively. The quantum efficiency for monochromatic sensors is typically higher across a broader range of wavelengths than individual color sensors. For example, curve 540 is an example of a sensor quantum efficiency for a blue sensor, curve 550 is an example sensor quantum efficiency curve for a green sensor, and curve 560 is an example sensor quantum efficiency curve for a red sensor. Although the monochromatic sensor array 500 does not allow for color imaging, or color sensing, it is evident by comparison of FIGS. 5A and 5B the monochromatic sensor array has higher spatial resolution than the Bayer color sensor array 520 due to the monochromatic sensors being sensitive across a broader range of colors, or wavelengths, than the color sensors, and the monochromatic sensors being more compact than color sensors of the same kind.

Figure 6A:
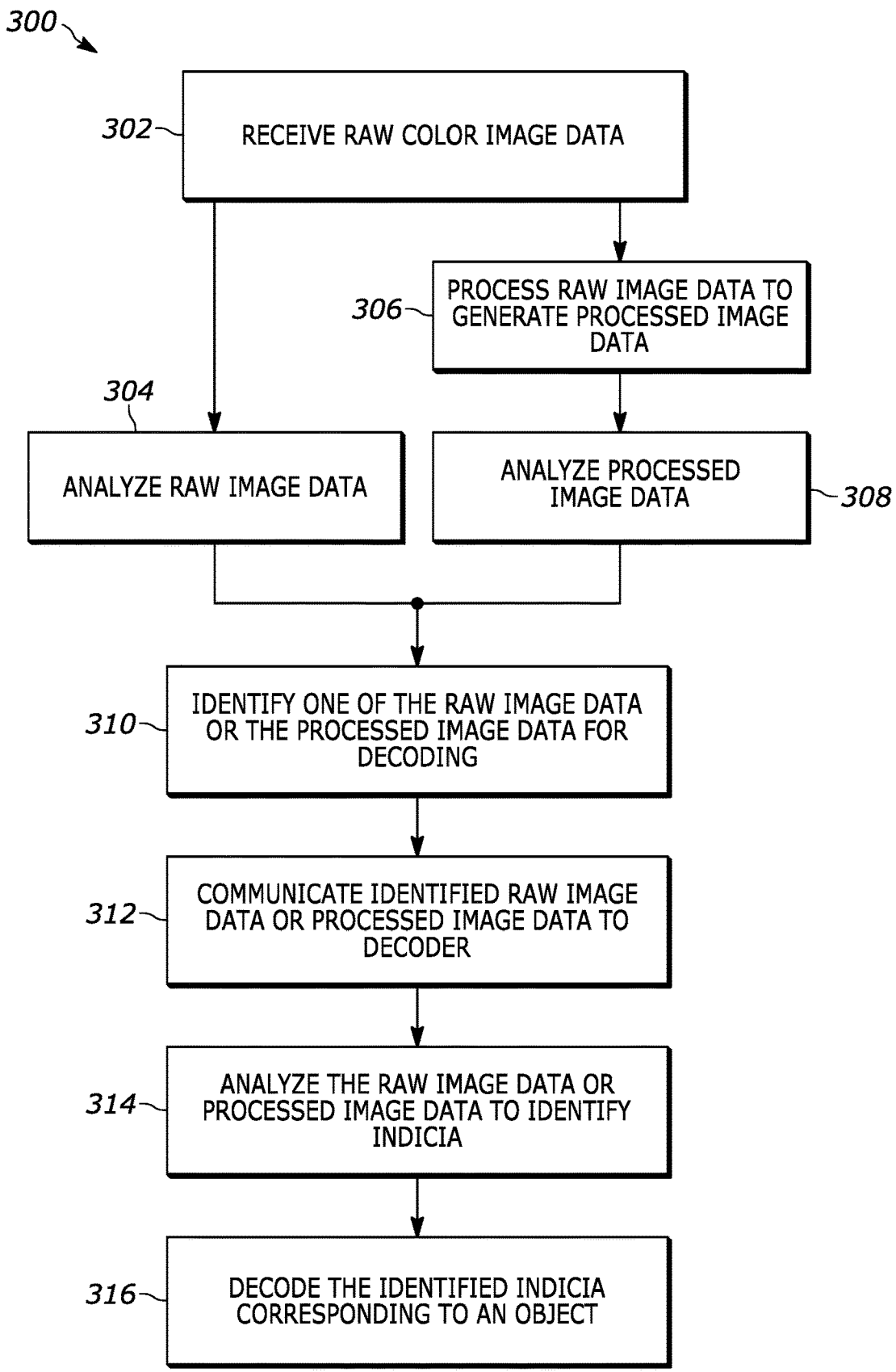
FIG. 6A is a flow diagram of an embodiment of a process for color image processing in a barcode reader as may be performed by the barcode reader of FIG. 1.
Figure 6B:
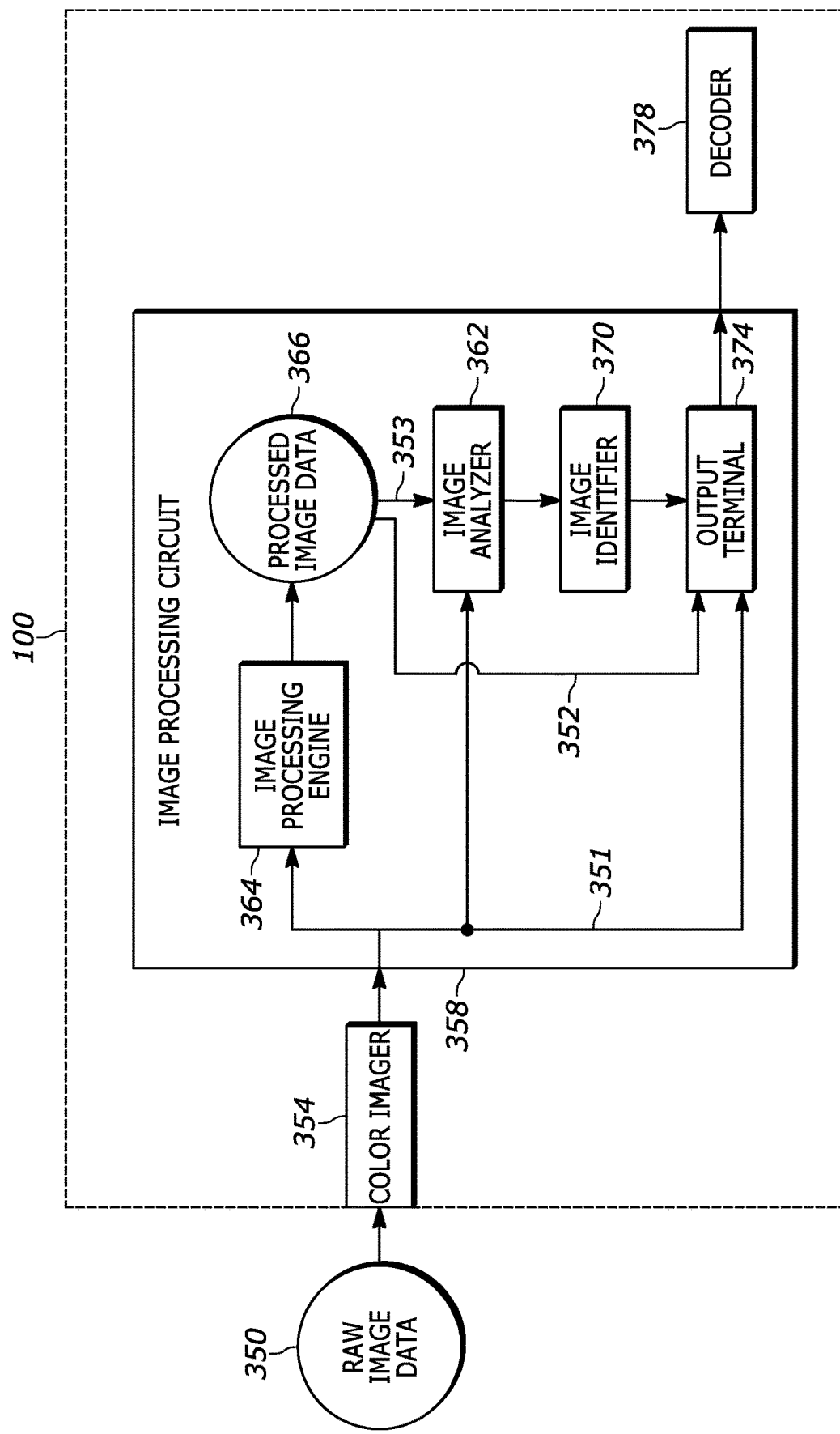
FIG. 6B is a data flow diagram with functional blocks for performing the process illustrated in FIG. 6A.

Referring now to FIGS. 6A and 6B simultaneously, FIG. 6A is a flow diagram of an embodiment of a process 300 for color image processing in a barcode reader as may be performed by the barcode reader 100 of FIGS. 1-3. FIG. 6B is a data flow diagram with functional blocks for performing the process illustrated in FIG. 6A. Initially, at a process 302 the barcode reader 100 receives one or more color images of a target or target environment at a color imager 354. In embodiments, the color imager 354 may be the imaging sensor 120 of FIG. 3, and the color image may be captured by the imaging sensor 120. The color image is received by the color imager 354 as raw image data 350. At this point, the image data may be sent directly to the output terminal 374 via an unprocessed path 351, the data may undergo partial image processing via the partial processing path 352, or the image data may undergo a full processing via the full processing path 353. At a process 304, the raw image data 350, indicative of the captured image, is provided to an image processing circuit 358 and an image analyzer 362 in the image processing circuit 358 analyzes the raw image data 350. At a process 306, the image processing circuit 358 may perform image signal processing on the raw mage data 350 at an image processing engine 364 to output processed image data 366. At a process 308 the image processing circuit 358 may analyze the processed image data 366 at an image analyzer 362.

At the process 308 the image analyzer 362 may analyze the raw and processed image data 350 and 366 to determine one or more of a plurality of image characteristics or parameters pertaining to the raw and processed image data 350 and 366. For example, the image analyzer 362 may determine a characteristic of the raw and/or processed image data 350 and 366 by performing statistical analysis or mathematical transformations on the raw and/or processed image data 350 and 366. For example, the image analyzer 362 may perform at least one of a spatial frequency content analysis, chromatic content analysis, spatial resolution analysis, image size analysis, a sharpness analysis, an image contrast analysis or another image analysis to determine image properties of the raw and/or processed image data 350 and 366.

At a process 310, the image analyzer 362 may provide the image characteristics of the raw and/or processed image data 350 and 366 to an image identifier 370 and the image processing circuit 358 may identify either the raw image data 350 or the processed image data 366 for further analysis and decoding. The image identifier 370 may use the image characteristics to determine which of the raw or processed image data 350 and 366 to identify for further decoding. For example, if it is determined that the spatial resolution of features in the raw image data 350 exceeds a certain threshold then it may be desirable to further process the raw image data 350 as not to lose spatial content and resolution from further image processing, which may cause errors in decoding indicia contained in the image. In another example, the image identifier 370 may determine that the raw image data 350 exceeds a certain amount of chromatic content and therefore the processed image data 366 may be identified for further decoding to allow for the use of chromatic information during the decoding of the processed image data 366. In examples, the image identifier 370 may identify one of the raw image data 350 or processed image data 366 for further decoding based on a plurality of image characteristics, such as a required level of brightness and a required sharpness level. It is envisioned that any number of image characteristics may be used by the image identifier 370 to identify which of the raw image data 350 or processed image data 366 is to be further decoded.

At a process 12, the image identifier 370 sends an image identification of the raw image data 350 or the processed image data 366 to an output terminal 374. The output terminal 374 receives the raw image data 350 from the color imager 354, the processed image data 366 from the image processing engine 364, and the image identification from the image identifier 370, and communicates the identified raw image data 350 or processed image data 366 from the image processing circuit 358, to an indicia decoder 378.

At a process 316, the indicia decoder 378 analyzes the received raw image data 350 or processed image data 366 and identifies an indicia corresponding to an object or target, and further, the indicia decoder 378 decodes the indicia indicative of the object or target.

The embodiment of the process illustrated in FIGS. 6A and 6B may allow for faster operation of a barcode reader. For example, the image identifier 370 may determine that the raw image data 350 be further decoded while the image processing engine 364 is performing one or more of a plurality of image processing techniques or algorithms on the raw image data 350. Therefore, the raw image data 350 may be provided to the indicia decoder 378 and the decoder 378 may decode the indicia before the processed image data 166 is generated by the image processing engine 164, reducing the processing time of decoding a barcode.

Figure 7:
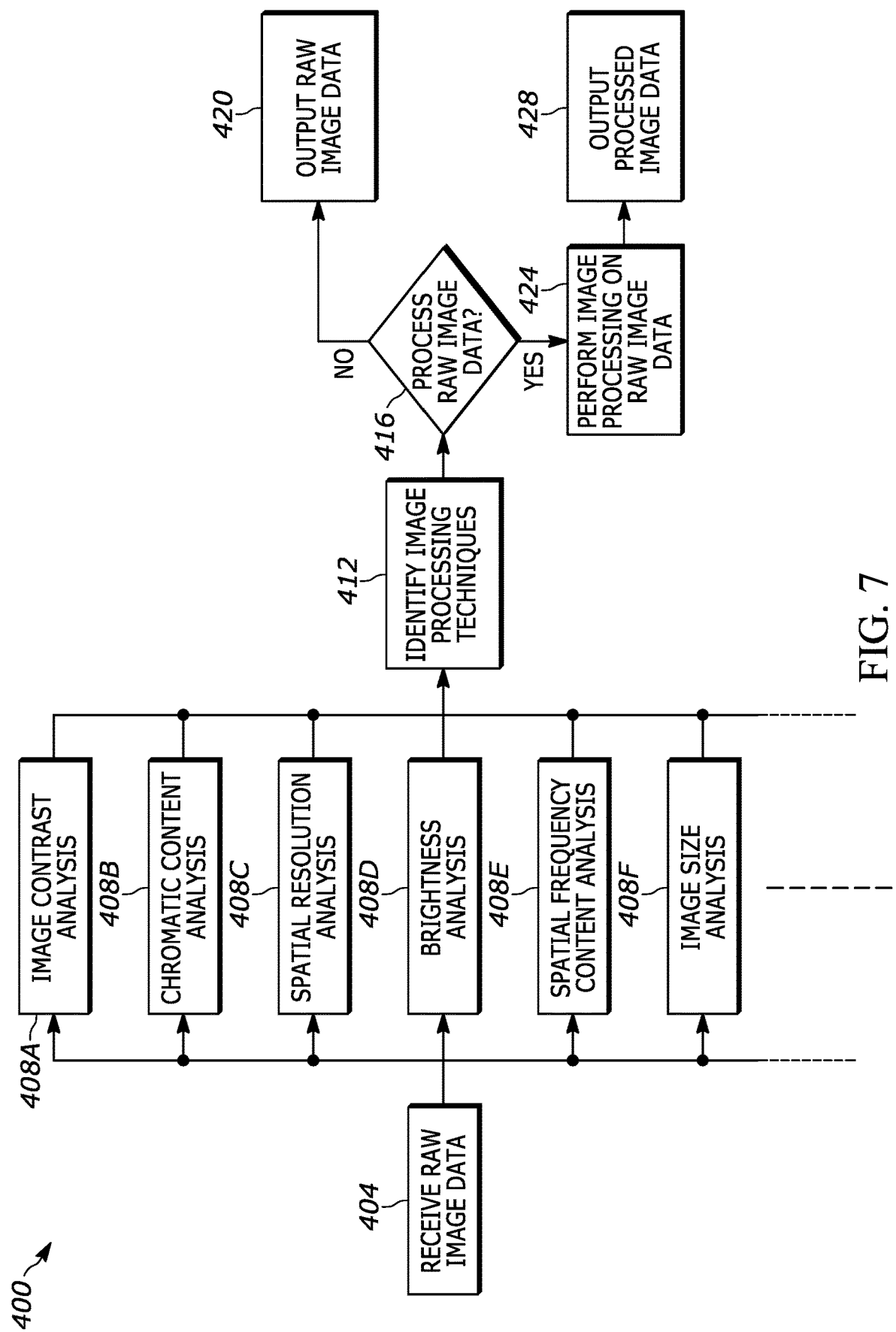
FIG. 7 is a flow diagram of a process for identifying whether to perform image processing on raw image data or not to perform image processing on raw image data, for decoding of a barcode.

While FIGS. 6A and 6B present the raw and processed image data analysis in a parallel computing manner, in other embodiments, the process may be performed in a series computing manner. For example, the raw image data may be analyzed and subsequently, one or more of a plurality of image processing techniques may be determined to be performed on the raw image data. FIG. 7 is a flow diagram of a process 400 for determining if image processing should be performed on raw image data, and if so, identifying one or more image processing techniques to perform on raw image data, for decoding of a barcode. The image processing identification process 400 illustrated in FIG. 7 may be performed by the barcode reader 100 of FIGS. 1-3, and may be substantially represented by the functional data flow diagram of FIG. 6B with the image processing identification process 400 being performed in the image processing engine 364. The process 400 of FIG. 7 may be performed by a dedicated image process identifier in the image processing circuitry, such as the image processing circuit 358 of FIG. 6B. In embodiments, the process 400 may be performed by the image process engine 364 of the image processing circuit 358 in FIG. 6B. Or in still other embodiments, the process 400 may be performed at an image detector such as the color imager 354 of FIG. 6B, and the identified image processing methods may be communicated to the image processing circuit 358 for further processing and analysis.

At a process 404, an image processing identifier receives raw image data. Various image analysis techniques are then performed at processes 408A through 408F, on the raw image data. Some of the image analysis techniques may include an image contrast analysis 408A, chromatic content analysis 408B, spatial resolution analysis 408C, brightness analysis 408D, spatial frequency content analysis 408E, an image size analysis 408F, or another type of image analysis. At a process 412, the various results of the image analysis performed in processes 408A-408F are analyzed, and at a process 416, an image processing technique is identified, or it is determined that the raw image should not be image processed further.

If at process 416 an image process is identified, then the image processing technique is performed on the raw image data at process 424. The image processing technique perform on the raw image data at process 424 may be one of applying an identity mask, a spatial lowpass filter, a spatial highpass filter, a Fourier transform, a Fourier lowpass filter, a Fourier highpass filter, an edge detection, a rotation, a scale, a shear, sharpening, blurring, mosaicing, demosaicing, patch extraction, and patching, among other image processing techniques. Certain image processing techniques may be determined at the process 412 to be preferable for different images. For example, the chromatic content analysis 408B may determine that there is a high amount of chromatic content, or colors, in the raw image data. Therefore, it may be determined that demosaicing techniques may be perform at process 424 to reconstruct color image data from the raw image data. Additionally, at process 412, multiple processing techniques may be determined to be performed in series on the raw image data. For example, a demosaicing technique may be performed to reconstruct color image data, and then a sharpening technique may be performed to increase the sharpness of the reconstructed color image. Further still, the process 412 may identify multiple image processing techniques to be performed independently on the raw image data such that the process 424 generates multiple sets of processed image data.

At process 428, the processed image data, or sets of processed image data, are output for further analysis and decoding of indicia contained in the processed image data. If at process 416 it is determined that the raw image data should not be processed, then at process 420 the raw image data is output for further analysis and decoding of indicia contained in the raw image data.

By determining a preferred processing technique, the accuracy and scanning range of a color image barcode reader may be improved. Additionally, machine learning may be implemented in a barcode reader to better determine what image processing techniques, if any, are best for decoding of indicia in images with certain characteristics, such as low light, high color content, or high spatial resolution.

FIGS. 8A and 8B show percent decode plots verse barcode scanning distance for a monochromatic barcode reader in FIG. 8A and a color image barcode reader in FIG. 8B, with both of the barcode readers scanning a black and white Universal Product Code (UPC) barcode, illustrated in FIG. 8C. No additional image processing was performed on the raw image data before the barcode was attempted to be decoded, in the results of FIGS. 8A and 8B. The y-axis in FIGS. 8A and 8B is the percent decode of the barcode with 1 being a 100% decode rate, 0.5 being a 50% percent decode rate, and so forth, and the x-axis being a scanning distance of the barcode reader. The dotted region below 20 inches in FIGS. 8A and 8B represents the distances that the barcode reader has a 100% decode rate. To provide a baseline, the 50% decode rate was chosen as the lower limit for determining a effective scanning distance ability of the barcode readers in FIGS. 8A, 8B, and the percent decode plots for other scenarios presented herein. FIGS. 8A and 8B show that both the monochromatic barcode reader and the color image barcode reader are able to effective decode the barcode of FIG. 8C at nominal distances up to 24 inches away from the barcode, with no image processing applied to the raw image data before identifying and decoding the barcode from the raw image data. The baseline of 24 inch decode distance will be used in reference to FIGS. 9A, 9B, 10A, and 10B to illustrate some of the benefits of the methods and systems described herein. In other examples, such as with different resolution barcodes, different types of barcodes, or different color barcodes, the baseline measurement without image processing is expected to vary for either the monochromatic barcode reader and/or the color image barcode reader.

FIGS. 9A and 9B are percent decode verse scanning distance plots of a color image barcode sensor scanning a black and white UPC barcode, illustrated in FIG. 9C. FIG. 9A presents results of decoding the barcode without performing image demosaicing on the raw image data, while FIG. 9B presents the results of successfully decoding the barcode after performing a linear demosaicing on the raw image data. The decode range of the barcode using the raw data (FIG. 9A) is 24 inches, while the decode range of the barcode after the raw data has been demosaiced is reduced to ~20.5 inches. The reduction of the scanning distances illustrated by FIGS. 9A and 9B may be due to a reduction of image contrast due to the smoothing of the image during demosaicing. It may therefore not be preferable to perform image processing, such demosaicing, on raw data from a color image sensor, if the raw image data is analyzed and it is determined that the image data already exhibits certain image characteristics such as a level of spatial resolution or contrast.

Figure 10B:
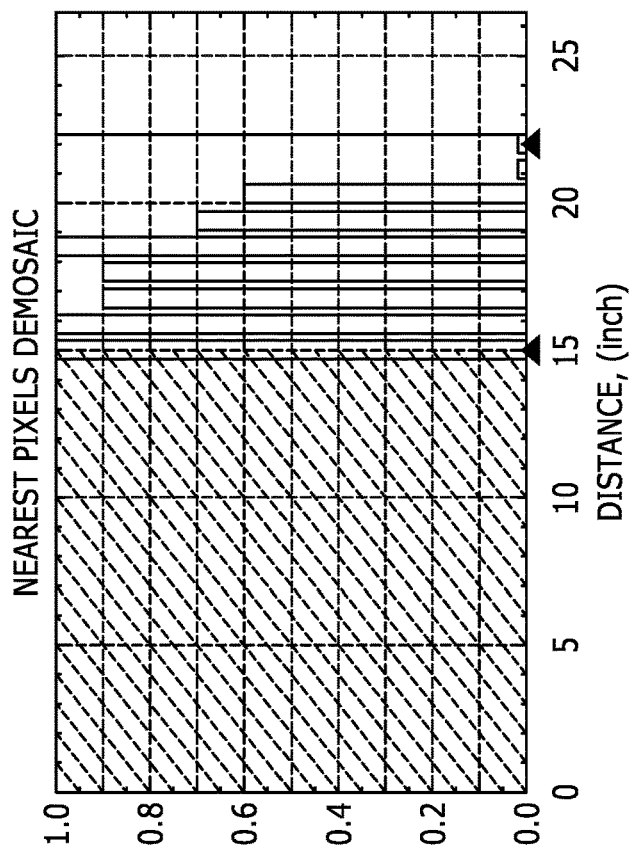
FIG. 10B is a percent decode verse scanning distance plot for a color image barcode reader scanning a red UPC barcode with nearest pixel demosaicing performed on the raw image data.
Figure 10A:
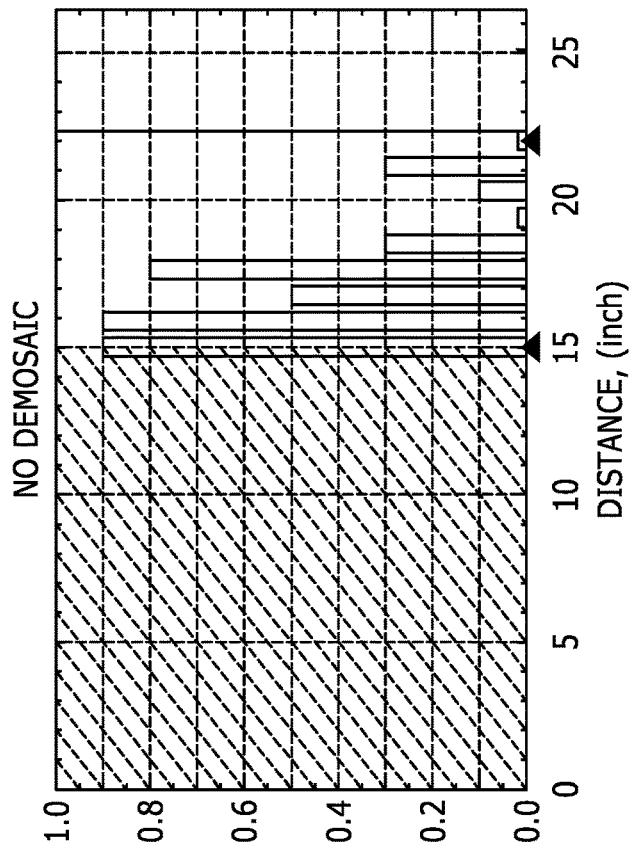
FIG. 10A is a percent decode verse scanning distance plot for a color image barcode reader scanning a red UPC barcode with no image processing performed on the raw image data.

FIGS. 10A and 10B are percent decode verse scanning distance plots for a color image barcode reader scanning a red UPC barcode. FIG. 10A shows the decode range with no image processing performed on the raw image data, and FIG. 10B shows the decode range results with nearest pixel demosaicing performed on the raw image data before decoding of the barcode from. The decode range of decoding the raw image data (FIG. 10A) is ~18 inches, while the demosaiced image data results in a decode range of closer to 20.5 inches. In the case of FIGS. 10A and 10B, the raw image data had low resolution due to the barcode only being successfully received at the red detectors. In the example of FIG. 10B, the demosaicing process interpolates the color information at the blue and green detector pixels allowing for a smoothing out and filling in of missing color information due to the low pixel resolution of the red detectors, as shown in FIG. 5B. Compared to the results of FIGS. 9A and 9B where demosaicing reduced the decode range of a color sensor decoding a black and white barcode, the results of FIGS. 10A and 10B show the benefits of determining whether or not to perform image processing on raw image data due to any number of image characteristics, such as chromatic information.

Figure 11A:
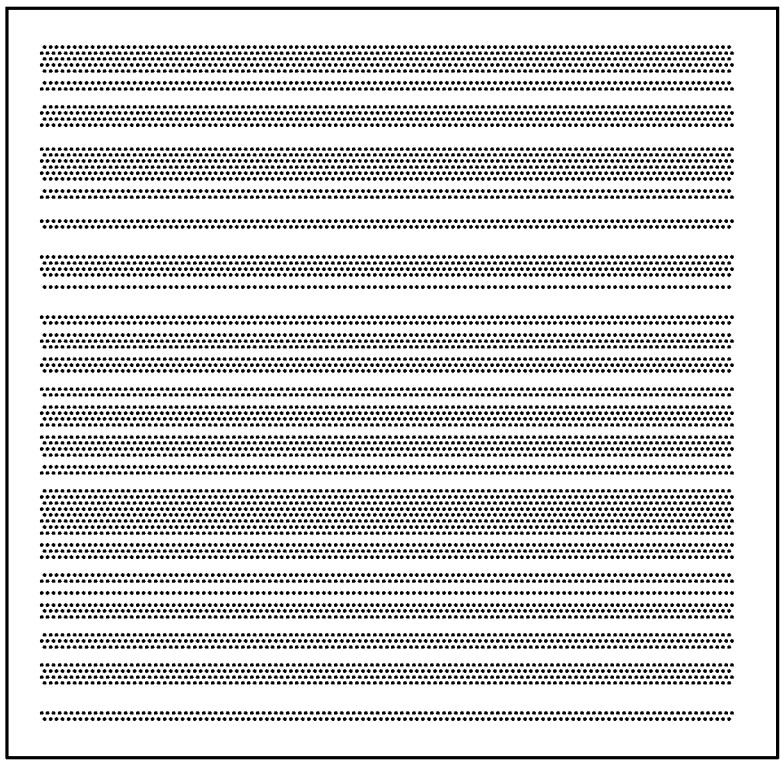
FIG. 11A is an image of a red UPC barcode constructed from raw image data received from a color barcode scanner.
Figure 11B:
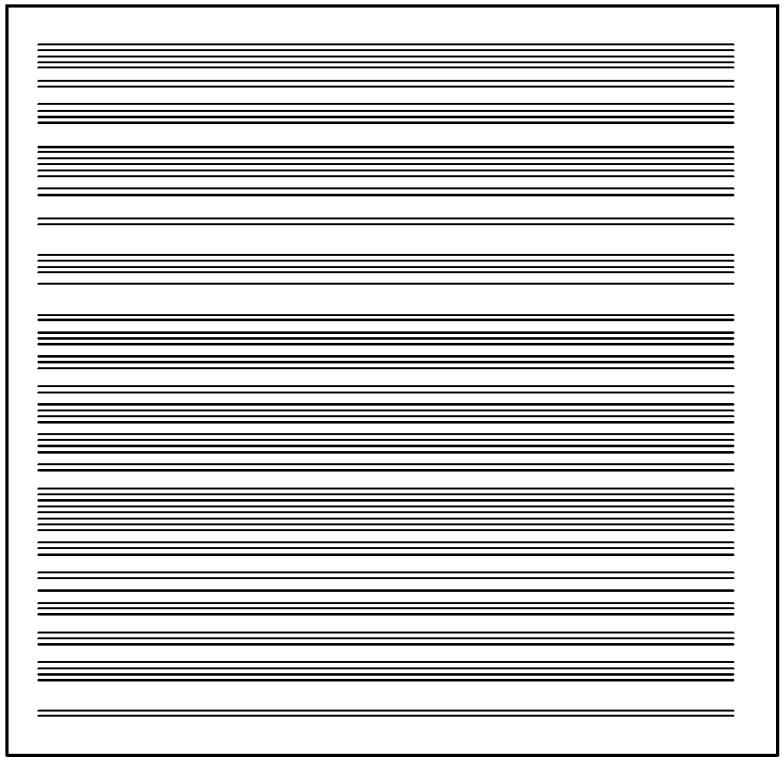
FIG. 11B is an image of a red UPC barcode constructed from demosaiced image data received from a color barcode scanner.

FIGS. 11A and 11B are a raw data image and a demosaiced barcode image, respectively, of a red UPC barcode captured by a color barcode reader. FIGS. 11A and 11B are included to provide visual representations of some of the concepts for image processing and decoding of a color barcode as described herein. FIG. 11A shows that the red barcode image has pixelated, lower resolution raw images due to the lower spatial resolution of the red detectors in a color imager. FIG. 11A may be difficult for a decoder to properly decode so it may be desirable to perform image processing on the raw image data presented by FIG. 11A. For this example, the spatial frequency content may be analyzed and it may be determined that the high spatial frequency content of the image of FIG. 11A exceeds a high frequency content threshold. It may be determined that demosaicing of the raw image data be performed before attempting to decode the barcode presented in FIG. 11A. FIG. 11B shows the results of the processed image data from FIG. 11A after a nearest pixel demosaicing has been performed on the raw image data. The smoother barcode features shown in FIG. 11B may increase a color barcode reader's accuracy and/or decode range, as shown in the results of the plots in FIGS. 10A and 10B.

While FIGS. 8A, 8B, 9A, 9B, 10A, and 10B pertain to decoding of a black and white, or color, UPC, similar trials conducted and results have been determined for decoding of black and white, and color, 10 mil datamatrix barcodes, 6.7 mil Portable Data File (PDF) barcodes, 5 mil PDF high density barcodes, and various types of barcodes with color backgrounds or substrates that the barcode is printed on or imprinted therein, for example a cyan barcode printed on a brown packaging.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A method for color image processing in a barcode reader, the method comprising:
   receiving, by a color imager in the barcode reader, a raw image data of an image of an object;
   generating, at an imaging circuit of the color imager, processed image data from the raw image data;
   analyzing, at the imaging circuit, (i) the raw image data and (ii) the processed image data;
   comparing, by the imaging circuit, the analysis of the raw image data to the analysis of the processed image data and identifying one of the raw image data and the processed image data for decoding;
   communicating the identified one of the raw image data or the processed image data to an indicia decoder; and
   analyzing, in the indicia decoder, the identified one of the raw image data or the processed image data to identify an indicia corresponding to the object, and decoding an identified indicia.

2. The method of claim 1, wherein analyzing the raw image data and the processed image data comprises:
   performing, in the imaging circuit, a statistical analysis on the raw image data and, in response, identifying one of the raw image data and the processed image data for decoding.

3. The method of claim 2, wherein performing the statistical analysis comprises at least one of performing a spatial frequency content analysis, chromatic content analysis, spatial resolution analysis, image size analysis, sharpness analysis, or image contrast analysis.

4. The method of claim 1, wherein analyzing the raw image data and the processed image data comprises:
   generating, in the imaging circuit, the processed image data from the raw image data by performing a demosaicing on the raw image data.

5. The method of claim 1, wherein analyzing the raw image data and the processed image data comprises:
   demosaicing, in the imaging circuit, color image data contained in the raw image data;
   reconstructing, in the imaging circuit, the color image data, a reconstructed color image data being the processed image data; and
   performing, in the imaging circuit, a statistical analysis on the reconstructed color image data and, in response, identifying the one of the raw image data and the reconstructed color image data for decoding.

6. The method of claim 5, wherein performing the statistical analysis comprises at least one of performing a spatial frequency content analysis, chromatic content analysis, spatial resolution analysis, image size analysis, sharpness analysis, or image contrast analysis.

7. The method of claim 1, wherein the imaging circuit is configured to output the raw image data and/or a plurality of processed image data sets generated from the raw image data, and further comprising:
   analyzing, at the imaging circuit, the raw image data and/or the plurality of processed image data sets to identify one of the raw image data or one of the sets of the plurality of processed image data sets for decoding;
   communicating an identified one of the raw image data or one of the sets of the plurality of processed image data sets to an indicia decoder; and
   analyzing, in the indicia decoder, the identified one of the raw image data or the one of the sets of the plurality of processed image data sets to identify an indicia corresponding to the object, and decoding an identified indicia.

8. The method of claim 7, wherein analyzing the raw image data and/or the plurality of processed image data sets is performed at the imaging circuit in a parallel processing manner.

9. The method of claim 1, wherein the imaging circuit of the color imager configured to output the processed image data is further configured to generate the processed image data by applying, to the raw image data, at least one of an identity mask, a spatial lowpass filter, a spatial highpass filter, a Fourier transform, a Fourier lowpass filter, a Fourier highpass filter, an edge detection, a rotation, a scale, a shear, mosaicing, demosaicing, patch extracting, and patching.

10. A barcode reader comprising:
a color imager configured to receive raw image data of an image of an object;
a non-transitory memory configured to store the image data and computer readable instructions;
an imaging circuit configured to output the raw image data and/or to output processed image data generated from the raw image data;
an indicia decoder; and
one or more processors configured to execute the computer readable instructions causing the color image scanning system to:
receive, by the color imager, raw image data indicative of an image of an object;
generate processed image data from the raw image data;
analyze (i) the raw image data and (ii) the processed image data;
compare the analysis of the raw image data to the analysis of the processed image data and identify one of the raw image data or the processed image data for decoding;
communicate the identified one of the raw image data or the processed image data to an indicia decoder;
analyze, in the indicia decoder, the identified one of the raw image data or the processed image data to identify an indicia corresponding to the object; and
decode an identified indicia.

11. The barcode reader of claim 10, wherein to analyze the raw image data and the processed image data the computer readable instructions cause the color image scanning system to:
perform, in the imaging circuit, a statistical analysis on the raw image data and, in response, identifying one of the raw image data and the processed image data for decoding.

12. The barcode reader of claim 11, wherein to perform the statistical analysis the computer readable instructions cause the color image scanning system to perform at least one of a spatial frequency content analysis, chromatic content analysis, spatial resolution analysis, image size analysis, sharpness analysis, or image contrast analysis.

13. The barcode reader of claim 10, wherein to analyze the raw image data and the processed image data the computer readable instructions cause the color image scanning system to:
generate, in the imaging circuit, the processed image data from the raw image data by performing a demosaicing on the raw image data.

14. The barcode reader of claim 10, wherein to analyze the raw image data and the processed image data the computer readable instructions cause the color image scanning system to:
demosaic, in the imaging circuit, color image data contained in the raw image data;
reconstruct, in the imaging circuit, the color image data, a reconstructed color image data being the processed image data; and
perform, in the imaging circuit, a statistical analysis on the reconstructed color image data and, in response, identifying the one of the raw image data and the reconstructed color image data for decoding.

15. The barcode reader of claim 14, wherein to perform the statistical analysis the computer readable instructions cause the color image scanning system to perform at least one of a spatial frequency content analysis, chromatic content analysis, spatial resolution analysis, image size analysis, sharpness analysis, or image contrast analysis.

16. The barcode reader of claim 10, wherein the imaging circuit is configured to output the raw image data and/or a plurality of processed image data sets generated from the raw image data, and the computer readable instructions cause the color image scanning system further to:
analyze, at the imaging circuit, the raw image data and/or the plurality of processed image data sets to identify one of the raw image data or one of the sets of the plurality of processed image data sets for decoding;
communicate an identified one of the raw image data or one of the sets of the plurality of processed image data sets to an indicia decoder; and
analyze, in the indicia decoder, the identified one of the raw image data or the one of the sets of the plurality of processed image data sets to identify an indicia corresponding to the object, and decode an identified indicia.

17. The barcode reader of claim 16, wherein the imaging circuit analyzes the raw image data and/or the plurality of processed image data sets in a parallel processing manner.

18. The barcode reader of claim 10, wherein the imaging circuit configured to output the processed image data is further configured to generate the processed image data by applying, to the raw image data, at least one of an identity mask, a spatial lowpass filter, a spatial highpass filter, a Fourier transform, a Fourier lowpass filter, a Fourier highpass filter, an edge detection, a rotation, a scale, a shear, mosaicing, demosaicing, patch extracting, and patching.

19. A method for color image processing comprising:
receiving, by a color imager, raw image data of an image of an object;
processing, at an imaging circuit, the raw image data to generate processed image data;
analyzing, at a processor, the raw image data and the processed image data by performing a statistical analysis on at least one of the raw image data and the processed image data;
comparing, at the processor, the analysis of the raw image data and the processed image data to identify one of the raw image data; and
identifying, at the processor and from the comparison, one of the raw image data or processed image data for detection of an indicia and decoding of the indicia.

20. The method of claim 19, wherein processing the raw image data to generate the processed image data comprises applying, to the raw image data, at least one of an identity mask, a spatial lowpass filter, a spatial highpass filter, a Fourier transform, a Fourier lowpass filter, a Fourier highpass filter, an edge detection, a rotation, a scale, a shear, mosaicing, demosaicing, patch extracting, and patching.

21. The method of claim 20, wherein performing the statistical analysis comprises at least one of performing a spatial frequency content analysis, chromatic content analysis, spatial resolution analysis, image size analysis, sharpness analysis, or image contrast analysis.

* * * * *